US007935284B2

(12) United States Patent
Metten

(10) Patent No.: US 7,935,284 B2
(45) Date of Patent: May 3, 2011

(54) METHOD FOR FABRICATING CONCRETE BLOCKS OR CONCRETE SLABS

(75) Inventor: Hans-Josef Metten, Bergisch Gladbach (DE)

(73) Assignee: METTEN Stein + Design GmbH & Co. KG, Overath (DE)

( * ) Notice: Subject to any disclaimer, the term of this patent is extended or adjusted under 35 U.S.C. 154(b) by 415 days.

(21) Appl. No.: 11/579,028

(22) PCT Filed: Dec. 15, 2005

(86) PCT No.: PCT/EP2005/013492

§ 371 (c)(1),
(2), (4) Date: Oct. 27, 2006

(87) PCT Pub. No.: WO2006/069636

PCT Pub. Date: Jul. 6, 2006

(65) Prior Publication Data

US 2007/0234679 A1 Oct. 11, 2007

(30) Foreign Application Priority Data

Dec. 24, 2004 (DE) ......................... 10 2004 062 656

(51) Int. Cl.

*D04H 1/16* (2006.01)
*B29C 41/22* (2006.01)
*B29C 69/00* (2006.01)
*B29C 41/32* (2006.01)

(52) U.S. Cl. ............................ 264/113; 264/74; 264/77

(58) Field of Classification Search .................. 264/113, 264/77, 74

See application file for complete search history.

(56) References Cited

U.S. PATENT DOCUMENTS

| | | | | |
|---|---|---|---|---|
| 3,650,784 | A * | 3/1972 | Albert et al. | 106/672 |
| 3,706,170 | A * | 12/1972 | Argraves et al. | 52/189 |
| 3,941,607 | A * | 3/1976 | Schuhbauer et al. | 106/284.01 |
| 5,156,902 | A * | 10/1992 | Pieper et al. | 428/206 |
| 5,248,338 | A * | 9/1993 | Price | 106/712 |
| 6,257,016 | B1 * | 7/2001 | Wade, Jr. | 62/604 |
| 6,461,552 | B1 * | 10/2002 | Geiger | 264/71 |
| 6,797,370 | B1 * | 9/2004 | Bechtoldt et al. | 428/294.7 |

FOREIGN PATENT DOCUMENTS

| | | | |
|---|---|---|---|
| DE | 3115673 | A1 * | 11/1982 |
| EP | 1431014 | A2 * | 6/2004 |

* cited by examiner

*Primary Examiner* — Khanh Nguyen
*Assistant Examiner* — Matthew Hoover
(74) *Attorney, Agent, or Firm* — Joseph T. Guy; Nexsen Pruet, LLC

(57) ABSTRACT

The invention relates to a method for the production of concrete blocks or concrete slabs of varying formats and sizes, whereby concrete is filled into molds for several blocks or slabs, the surface layer of which or the facing concrete layer of which has a base color and the surfaces, which have regions of difference colors, is puddled by means of vibration and/or compacting and subsequently hardened, whereby, before puddling, at least one portion of a pigmented and/or variously-pigmented and/or a color- and/or various color-containing finishing material is projected or thrown by means of at least one application device.

27 Claims, 2 Drawing Sheets

METHOD FOR FABRICATING CONCRETE BLOCKS OR CONCRETE SLABS

BACKGROUND OF THE INVENTION

The invention relates to a method for fabricating concrete blocks or concrete slabs of various formats and sizes, in which concrete is charged into molds for a plurality of blocks or slabs, its surface layer or its face concrete layer exhibits a ground color and its surfaces contain diversely colored places, the concrete is compacted by vibration and/or tamping and then cures. It is common to charge the raw concrete for concrete blocks and concrete slabs into the molds first, then to charge the face concrete, and then to compact the concrete blocks or concrete slabs. It is also possible, however, to fabricate the concrete blocks or concrete slabs in a single-step method without face concrete. Here, in order to fabricate varicolored concrete blocks or concrete slabs, it is known to impart a ground color to the surface layer in the single-step method or to the face concrete layer, as desired, which ground color can correspond to the concrete color without pigmentation or is pigmented in various colors.

From EP-1 017 554 B1 it is further known to fabricate the concrete mortar forming the face layer by variously pigmented layers, which are held one above another in the supply vessel and move freely downward in the supply vessel, thus mixing and passing onto the coarse concrete, guided via baffles, in order to form a marbled face layer that is subsequently compacted. This is a serviceable method wherein, however, there arise varicolored marbled batches that are capable to only a limited degree of satisfying the visual requirements for concrete blocks or concrete slabs that are supposed to look similar to natural stones, because only dot-like color patterns arise.

SUMMARY OF THE INVENTION

It is therefore an object of the invention to furnish a method that yields surfaces of concrete blocks or concrete slabs that look very similar to streaked and/or speckled natural stones. Here a textured surface is supposed to arise in which oriented veins and/or streaks and/or speckles dominate. The object of the invention is achieved in that at least one portion of a pigmented and/or variously pigmented finishing material or of a colored or diversely colored finishing material is thrown onto the surface layer or face concrete layer by at least one applicator before compaction. In this way it is possible to generate flamed, veined or speckled surfaces that look similar to the natural structure of natural stones. These surfaces can be generated or varied by varying the applicator, the portion or portions and the finishing material. The ground color of the surface layer or face concrete layer, which extends from uncolored concrete to varicolored concrete, also plays a role. The term "throw" in the process-engineering sense also means "sling," "shoot" or "blow" the finishing material onto the surface layer or face concrete layer. The finishing material is advantageously a pigmented and/or diversely pigmented concrete mix that yields the special visual appearance through application to the surface. Because the concrete mix is subsequently pressed into the surface or compacted there, a good bond with the surface layer or the face concrete layer comes about.

The finishing material can also exhibit or contain small rock grains, so that various materials diverse in color, also granulations of semiprecious stones or precious stones or mica or metal chips or plastic particles or glass particles, can be introduced into the surface layer or face concrete layer. The finishing material can also be an arbitrary rock blend. The finishing material preferably has a graded granulometric composition having a maximum grain diameter of 2 mm. The face concrete or the concrete surface layer preferably has a fine-grained granular structure, finer than or equal to screen cut C4. To an individual skilled in the art, C4 denotes fine-grained granular structure with granulations having diameters between 0 and 4.0 mm. Standardized screen tests with fixed screening machines are performed for assessment purposes. Diverse finishing materials, diversely pigmented concrete mixes including rock grains or rock mixtures or granulations or chips or particles can be contained in an applied portion. It is also possible, however, to apply a plurality of portions of the same or diverse finishing materials portion-wise onto the mold, as well as to apply a plurality of portions of the finishing material in succession to the surfaces of a mold.

According to the invention it is proposed that the applicator exhibits at least one centrifugal feeder disk or one paddle wheel or one throwing arm or one catapult, to which the portion or portions of the finishing material are supplied. These and the applicators described in what follows can move over the mold or beside the mold, and diverse portions can also be supplied to them at diverse time intervals. In a further development it is proposed that the applicator exhibits at least one metering vessel containing a finishing material and having a metering strip, the metering vessel being guided at a uniform or nonuniform speed over the mold. Here vibrations or vibratory impacts, performed uniformly and/or nonuniformly and/or intermittently, are preferably exerted on the metering strip. Diverse finishing materials and/or diverse portions of finishing material can be supplied to the metering strip along its extent. The metering vessel can also be mounted on the front edge of the metering carriage for the face concrete. It is further proposed to fashion the applicator as a pipe outlet through which the portion or portions of the finishing material are thrown onto the surface layer or face concrete layer. An especially good distribution onto the mold is brought about if the pipe outlet end is fashioned similarly to a nozzle. It also contributes to good distribution if ejection is effected with compressed air. The ejection of the finishing material can also be effected with a prestressed spring-loaded piston whose latching device is suddenly released for throwing. The applicator can preferably move over the mold or beside the mold. It can exhibit or attain diverse speeds of motion, an abrupt movement possibly being advantageous as well. Depending on the size of the mold and the color outfitting of the applicator with finishing material, a plurality of devices and also diverse devices can be utilized for one mold, so that throwing is rendered uniform or a special characteristic throwing pattern of the finishing material onto the layers is achieved. Guiding plates are preferably utilized in the applicators, because such disk wheels or throwing arms and also pipe outlets can have a greater scatter. A plurality of portions of the finishing material can be ejected in succession by the applicators, the finishing materials, as already described, possibly being diverse. It is further proposed that the pigmented or diversely pigmented concrete mix or also the face concrete or the concrete surface layer is plastic-modified and/or exhibits a silicate-concrete mixture. The rock grains or rock-grain mixture or granulations can be blended with an organic or inorganic binder. The binder is preferably colorless and is mixed with the rock grains or rock-grain mixtures or granulations or chips or particles before application, an acrylate dispersion being used for example as organic binder and a silicate for example as inorganic binder.

Before, but preferably after, compaction, an organic or inorganic agent, which is preferably colorless, can be applied to the surfaces of the concrete blocks or concrete slabs before, or also after, curing. Enhanced durability and protection against staining are achieved and lime blooms are reduced or prevented by this impregnation, sealing or coating of the concrete blocks or concrete slabs. After final compaction and before sealing, the surfaces and/or the edges of the surfaces of the concrete blocks or concrete slabs can be treated with brushes and thus can be textured and/or roughened and/or smoothed and/or projecting edges can be removed.

BRIEF DESCRIPTION OF THE DRAWINGS

For further explanation of the invention, reference is made to the Drawings, in which an exemplary embodiment of the invention is illustrated in simplified form.

DETAILED DESCRIPTION OF THE INVENTION

Figure 1:
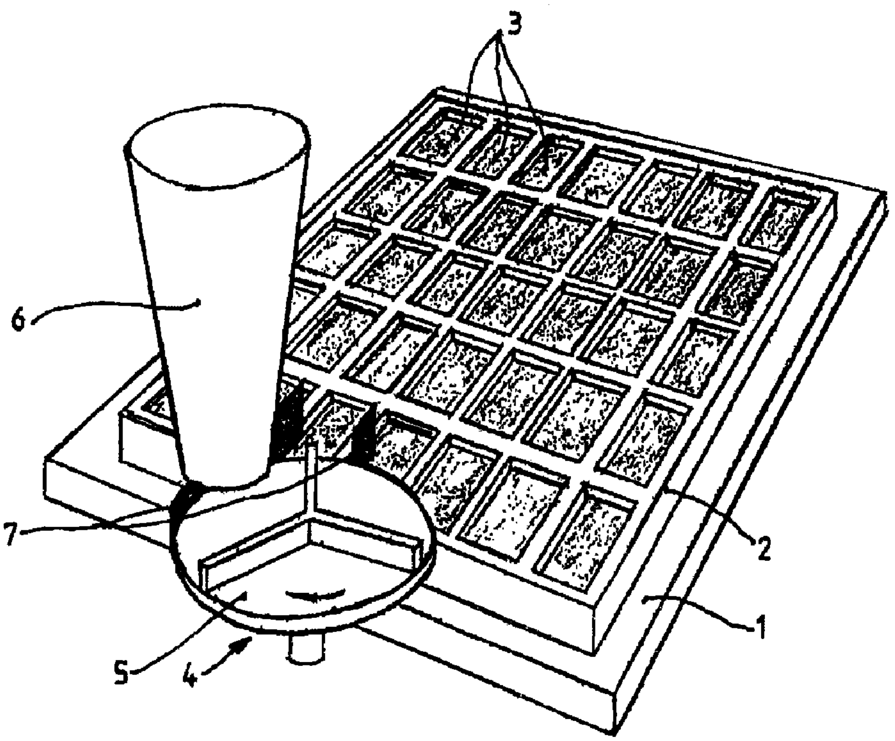
FIG. 1 is a perspective view of a mold board having a mold with concrete blocks and an applicator.
Figure 2:
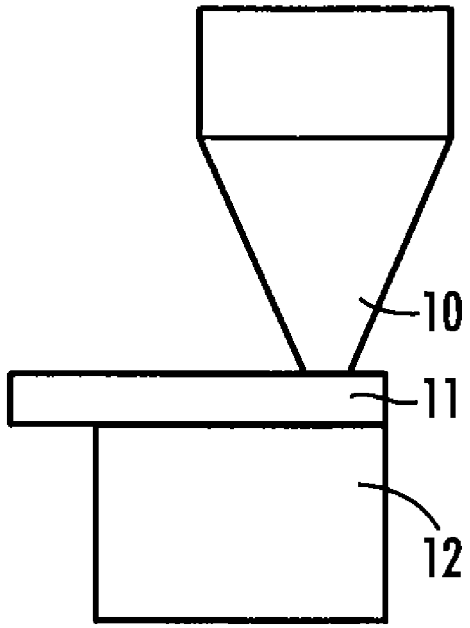
FIG. 2 is a schematic diagram of a metering vessel, metering strip and metering carriage.

In FIG. 1, reference character 1 denotes a mold board on which a mold 2 is arranged. Mold 2 exhibits a larger number of through openings (35 of them in FIG. 1) into which concrete is charged, on which board a face concrete layer 3 is applied and can be seen. As cannot be inferred from FIG. 1, the face concrete layer is pigmented. Further, 4 generally denotes an applicator that contains a centrifugal feeder disk 5. The plane of the centrifugal feeder disk is aligned roughly parallel to the surface of mold 2 and spaced some distance away therefrom. Applicator 4 can move along the side arranged in FIG. 1, but also along the other sides of the mold, so that all face concrete layers 3 can be reached in arbitrary fashion. Arranged above centrifugal feeder disk 5 is a hopper 6 into which finishing material (not visible) is charged. At its end facing toward centrifugal feeder disk (not visible), hopper 6 has a device for opening and closing the hopper discharge so that arbitrary portions of the finishing material can be conveyed onto the centrifugal feeder disk. A plurality of hoppers can be arranged above the centrifugal feeder disk, in which hoppers diverse finishing materials are contained, in order that the surfaces of face concrete layers 3 can be strewn with various finishing materials at various metering rates. The rotation speed of centrifugal feeder disk 5 and its height relative to mold 2 can be arbitrarily adjusted and varied, even during the throwing motion, and likewise the speed of motion along the mold. FIG. 2 illustrates a metering vessel, 10, which supplies material to a metering strip, 11. A metering carriage, 12, transport the metering strip. During use vibrations are exerted on the metering strip.

Further, reference character 7 denotes a guide device, which prevents the arbitrary casting of finishing material by the centrifugal feeder disk, in particular outside of mold 2, and steers the direction of throwing onto mold 2.

The invention claimed is:

1. A method for fabricating concrete blocks comprising the steps of:

providing a plurality of molds, charging raw concrete into said molds forming blocks;

applying to each block of said blocks a surface layer wherein said surface layer has a fine-grained adapted grain structure not greater than screen cut C4, throwing at least one portion of a pigmented finishing material on said surface layer of said formed blocks by at least one applicator to produce colored places simulating natural rock wherein said finishing material has a graded granulometric composition having a maximum grain diameter of 2 mm, compacting and vibrating said blocks, and curing said blocks.

2. The method of claim 1 wherein said finishing material is a pigmented concrete mix.

3. The method of claim 1 wherein said finishing material contains small rock grains.

4. The method of claim 3 wherein said finishing material is a rock mixture.

5. The method of claim 3 wherein said finishing material contains granulations of semiprecious stones.

6. The method of claim 1 wherein finishing materials are contained in said one portion.

7. The method of claim 1 wherein a plurality of portions are thrown onto the surfaces of said molds.

8. The method of claim 7 wherein a plurality of portions of said finishing material are thrown onto the surfaces of said molds in succession.

9. The method of claim 1 wherein said applicator has at least one centrifugal feeder disk to which said at least one portion of said finishing material is supplied.

10. A method for fabricating concrete blocks comprising the steps of:

providing a plurality of molds, charging raw concrete into said molds forming blocks, each of which has a surface layer wherein said surface layer has a fine-grained adapted grain structure not greater than screen cut C4, throwing at least one portion of a pigmented finishing material on said surface layer of said formed blocks by at least one applicator to produce colored places simulating natural rock, compacting said blocks, and curing said blocks wherein said applicator has at least one centrifugal feeder disk to which said at least one portion of said finishing material is supplied and wherein said applicator has at least one metering vessel containing a finishing material and having a metering strip, said metering vessel being guided over said molds.

11. The method of claim 10 wherein vibrations are exerted on said metering strip.

12. The method of claim 11 wherein diverse portions of finishing material are supplied to said metering strip along its extent.

13. The method of claim 10 wherein said metering vessel is mounted on the front edge of a metering carriage for said surface layer.

14. The method of claim 9 wherein said applicator has at least one pipe outlet to which one of a plurality of portions of a finishing material are supplied and through which the latter are thrown onto said surface layers of said blocks.

15. The method of claim 14 wherein said pipe outlet is equipped with a spring-loaded piston in the fashion of a shooting apparatus.

16. The method of claim 14 wherein ejection of said finishing material is effected with compressed air.

17. The method of claim 14 wherein the ejection end of said pipe outlet is fashioned similarly to a nozzle.

18. The method of claim 1 wherein said applicator (4) moves beside said molds during the application of said finishing material.

19. The method of claim 18 wherein said applicator (4) moves over or beside said mold (2) at a diverse speed.

20. The method of claim 1 wherein a plurality of applicators are utilized for one of said molds.

21. A method for fabricating concrete blocks comprising the steps of:

providing a plurality of molds, charging raw concrete into said molds forming blocks, each of which has a surface layer, throwing at least one portion of a pigmented finishing material on said surface layer of said formed blocks by at least one applicator to produce colored places simulating natural rock, compacting said blocks, and curing said blocks wherein a plurality of applicators are utilized for one of said molds and wherein a plurality of applicators (4) are utilized for one of said molds.

22. The method of claim 1 wherein said application includes a guide device.

23. The method of claim 1 wherein the concrete is a silicate-concrete mixture.

24. The method of claim 1 wherein said surface layer is plastic-modified.

25. The method of claim 1 wherein said surface layer includes rock-grain mixtures blended with an inorganic binder.

26. The method of claim 1 wherein an organic agent is applied to the surfaces of the concrete blocks before curing.

27. The method of claim 1 wherein the edges of the concrete blocks are treated with brushes after compaction and before curing to remove projecting edges.

* * * * *